No. 674,573. Patented May 21, 1901.
B. O. DAHL.
APPARATUS FOR SORTING TOBACCO LEAVES.
(Application filed Mar. 1, 1900.)
(No Model.) 2 Sheets—Sheet 1.
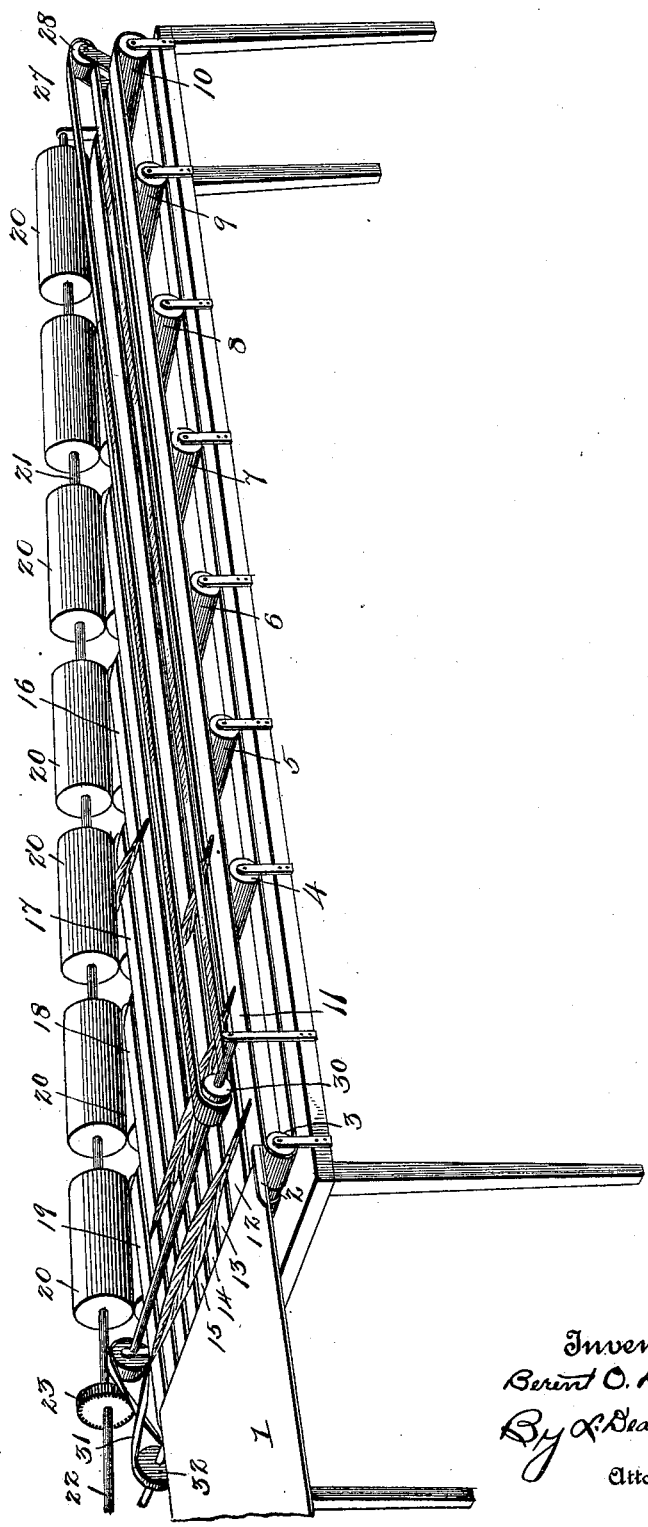
Witnesses
Inventor
Berent O. Dahl No. 674,573. Patented May 21, 1901.
B. O. DAHL.
APPARATUS FOR SORTING TOBACCO LEAVES.
(Application filed Mar. 1, 1900.)
(No Model.) 2 Sheets—Sheet 2.
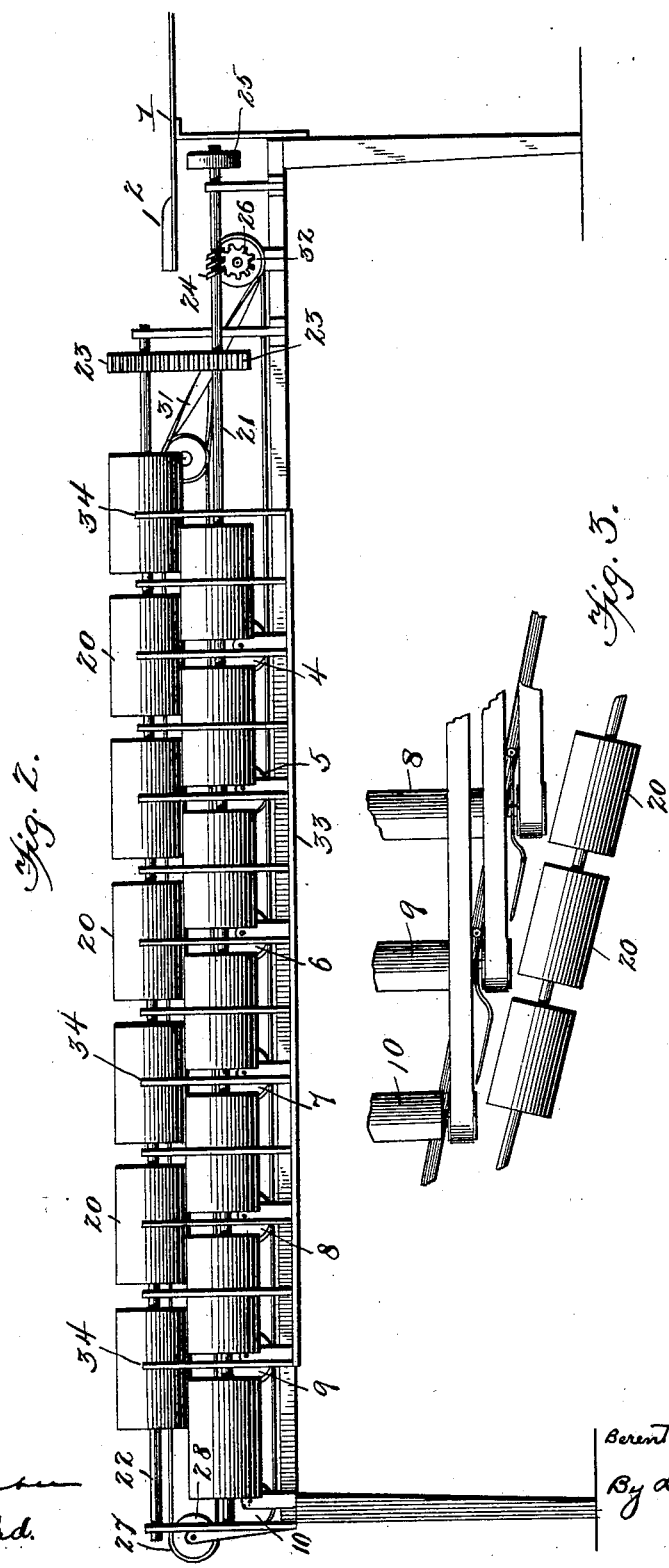

UNITED STATES PATENT OFFICE.

BERENT O. DAHL, OF VIROQUA, WISCONSIN.

APPARATUS FOR SORTING TOBACCO-LEAVES.

SPECIFICATION forming part of Letters Patent No. 674,573, dated May 21, 1901.

Application filed March 1, 1900. Serial No. 6,980. (No model.)

*To all whom it may concern:*

Be it known that I, BERENT O. DAHL, a citizen of the United States, residing at Viroqua, in the county of Vernon and State of Wisconsin, have invented certain new and useful Improvements in Apparatus for Sorting Tobacco-Leaves, of which the following is a specification, reference being had therein to the accompanying drawings.

My invention relates to apparatus for sorting tobacco-leaves according to size; and the invention consists in the features of construction and combination of parts hereinafter fully described, and defined in the appended claims, in connection with the accompanying drawings, which form a part of this specification.

Figure 1 is a view in perspective of a machine embodying my invention, and Fig. 2 illustrates a modification thereof. Fig. 3 is a detail view showing guard-springs arranged at the ends of the rollers.

The reference-numeral 1 designates a table provided at one end with a transverse cleat 2, which constitutes a stop and gage against which the butts of the leaves bear to facilitate their being conveniently fed to the apparatus.

The numerals 3, 4, 5, 6, 7, 8, 9, and 10 designate parallel rollers. The rollers 3 and 4 are of the same length; but the remainder of said rollers are of varying lengths, gradually diminishing in length from the front to the rear end of the machine.

11, 12, and 13 designate three endless belts supported by the rollers 3 and 10. A series of belts 14 to 19 are arranged upon the roller 3, parallel to the belts 11, 12, and 13. These belts 14 to 19 vary in length and are supported one upon each of the rollers 4 to 9.

Adjacent to the inner ends of the rollers 4 to 10 are arranged seven pairs of sorting-rolls 20, all mounted upon two parallel shafts 21 and 22, having bearing in any suitable supports on the frame and each provided with a gear-wheel 23.

It will be understood, of course, that the invention is not restricted to any particular number of pairs of rolls 20 or belts 14 to 19, the number of such parts depending upon the number of grades or sizes of leaves to be sorted.

The lower shaft 21 is extended at its front end and provided with a worm 24 and a belt-pulley 25. The worm 24 meshes with a gear-pinion 26 on the end of the front roller 3, so that all of the belts are driven from the shaft 21.

27 designates a belt supported upon pulleys 28 and 30 and adapted to be driven by a cross-belt 31 from the pulley 32. This belt 27 travels almost in contact with the belt 12 and is designed to hold the leaves in place until they are caught by the pair of rolls to which their length directs them.

The rolls 20 are made of rubber or like yielding material to prevent injury to the leaves passing between them.

The operation of the machine is as follows: An attendant lifts the leaves from the table 1 onto the belts, and, as shown in the drawings, the leaves being of different lengths are carried along by the belts until they are caught by one of the pairs of rolls 20. The longest leaves are caught by the first pair of rolls, while the shorter ones pass rearward until they contact with one pair of the rolls, each pair of the rolls being adapted to catch leaves of different lengths, the shortest leaves passing to the rear end of the table. After the leaves pass between the sorting or sizing rolls they are deposited upon a table 33, divided by vertical partitions 34 into separate compartments.

In Fig. 2 I show a modification in which the rolls 20 are so relatively arranged as to overlap, whereby the same number of rolls can be made to double the sorting capacity of the machine.

As shown in Fig. 3, I provide a series of bent guard-springs 35, each secured at one end to the frame of the machine and having its free end extended in the direction of travel of the belts to direct the leaves to the roller-passes and prevent their dropping down at the ends of the belts.

I claim—

1. A tobacco-leaf sorting or sizing machine, comprising a support and a series of conveyers of different lengths and sorting means arranged adjacent the terminals of said conveyers.

2. A tobacco-leaf sorting or sizing machine, comprising a series of substantially parallel conveyers of different lengths and leaf-sorting devices arranged to receive the leaves from the conveyers.

3. A tobacco-leaf sorting and sizing machine, comprising a series of substantially parallel endless conveyers of different lengths and a series of sorting devices each of which is arranged in relation to the conveyers to receive leaves of predetermined lengths.

4. A tobacco-leaf sorting and sizing machine, comprising a series of conveyers of different lengths, sorting mechanisms arranged at the ends of the conveyers and means for operating said mechanisms to effect the removal of the leaves as they approach the ends of said conveyers.

5. A tobacco-leaf sorting and sizing machine, comprising a series of substantially parallel conveyers of different lengths, and a series of pairs of sorting-rollers located at or adjacent to the ends of the conveyers and means for actuating said rollers to effect the removal of the leaves from said conveyers.

6. A tobacco sorting or sizing machine, comprising a series of conveyers of different lengths and sorting mechanism arranged to draw the leaves endwise as they approach the ends of the conveyers.

7. A tobacco-leaf sorting or sizing machine, comprising a series of substantially parallel endless conveyers of different lengths, a series of pairs of sorting-rollers having their axes at an angle with the line of travel of the conveyers and means for operating the rollers to effect the removal of the leaves as their ends are thrust between the rollers by the movement of the conveyers.

8. A tobacco-leaf sorting and sizing machine, comprising a series of conveyers of different lengths, sorting means for drawing the tobacco-leaves from said conveyers, and means for retaining the leaves upon the conveyers.

9. A tobacco-leaf sorting or sizing machine, comprising a series of conveyers of different lengths, means for retaining the leaves upon the conveyers and sorting mechanism arranged to effect their removal from the conveyers.

10. A tobacco-leaf sorting or sizing machine, comprising a series of endless conveyers, means for retaining the leaves thereon, a series of sorting devices arranged at or adjacent to the ends of the conveyers, and means for operating said devices to cause the leaves to be drawn endwise from the conveyers.

11. A tobacco-leaf sorting or sizing machine, comprising a series of conveyers, and sorting mechanism arranged adjacent to said conveyers.

12. A tobacco-leaf sorting or sizing machine, comprising a series of conveyers, sorting mechanism arranged adjacent to said conveyers, and means for retaining the leaves in their assorted condition after the same have been operated upon by said sorting mechanism.

13. A tobacco-leaf sorting or sizing machine, comprising a series of conveyers, sorting mechanism arranged adjacent to said conveyers, and means for directing the leaves to the sorting mechanism in their passage from the conveyers.

14. A tobacco-leaf sorting or sizing machine, comprising a series of conveyers, sorting mechanism arranged adjacent to said conveyers, and resilient means for directing the leaves to the sorting mechanism in their passage from the conveyers.

15. A tobacco-leaf sorting or sizing machine, comprising a series of conveyers, sorting mechanism arranged adjacent to said conveyers, and resilient guard-arms interposed between the conveyers and sorting mechanism for directing the leaves to the sorting mechanism in their passage from the conveyers.

In testimony whereof I affix my signature in presence of two witnesses.

BERENT O. DAHL.

Witnesses:
  OTTO OTTESON,
  LORON BEATY.